United States Patent

[11] 3,532,036

[72] Inventors Shigeya Nakamura
Yokohama-shi;
Koichi Furuta, Tokyo, Japan
[21] Appl. No. 751,535
[22] Filed Aug. 9, 1968
[45] Patented Oct. 6, 1970
[73] Assignee Nippon Kogaku K.K.
Tokyo, Japan
a corporation of Japan
[32] Priority Aug. 18, 1967
[33] Japan
[31] 42/52,654

[54] DEVICE FOR CORRECTING FULL OPEN F NUMBER IN A FULL OPEN PHOTOMETRY OF A SINGLE LENS REFLEX CAMERA
3 Claims, 11 Drawing Figs.
[52] U.S. Cl. ............................................... 95/10, 95/42, 95/64
[51] Int. Cl. .................................................... G03b 17/14, G03b 7/02
[50] Field of Search ............................................ 95/10C, 42, 64, 64B

[56] References Cited
UNITED STATES PATENTS
| | | | |
|---|---|---|---|
| 3,073,222 | 1/1963 | Broscnke | 95/10(C)UX |
| 3,461,783 | 8/1969 | Fujii | 95/10(C)UX |
| 3,485,153 | 12/1969 | Ono et al. | 95/10(C)UX |
| 3,485,154 | 12/1969 | Yamada | 95/10(C)UX |
| 3,486,434 | 12/1969 | Suzuki et al. | 95/10(C)UX |

*Primary Examiner*—Norton Ansher
*Assistant Examiner*—Joseph F. Peters, Jr.
*Attorney*—Anton J. Wille

ABSTRACT: An arrangement for compensating for the F numbers of interchangeable lenses provided for a single lens reflex camera having a through-the-lens photometric system, in which an exposure value or stop interlocking fork rotatable with the stop adjusting ring of the lens is coupled to an interlocking ring rotatably mounted on the camera body which in turn is coupled through a ratchet mechanism to a rotatable control ring for adjusting the exposure meter or its circuit in accordance with the full aperture openings of the lenses. The two rings are relatively rotatable and positionable in accordance with the difference in the angle of rotation of the stop adjusting (interlocking) ring from the full aperture position of the lens to the position corresponding to a given position on the lens or the control ring to provide the necessary compensation for the exposure meter or its circuit.

3,532,036

DEVICE FOR CORRECTING FULL OPEN F NUMBER IN A FULL OPEN PHOTOMETRY OF A SINGLE LENS REFLEX CAMERA

This invention relates to an exposure meter arrangement for a single lens reflex camera in which a through-the-lens photometric system is provided, the camera having a plurality of interchangeable lenses of different aperture ratios, and more particularly to an arrangement for compensating an exposure meter or its circuit for the different F numbers of the interchangeable lenses.

In a single lens reflex camera a portion of the light rays entering the objective is diverted either by a mirror or a prism, to fall on the light sensitive surface of a photocell to provide an exposure reading for the prevailing light conditions. Such through-the-lens photometering arrangements are known in the art. When the single lens reflex camera is provided with interchangeable lenses, full aperture photometry with the lenses of different F numbers will result in the transmission of different light intensities for the prevailing light conditions. This difference in light intensities must be compensated in the exposure meter circuit. Such corrections may be made either manually in which case there is no interconnection between the lenses and the exposure meter circuit except for the usual indexing marks to provide for the coupling of the various lenses. In a manual correction arrangement, each time a new lens is mounted on the camera, a correction factor must be made in the meter circuit either by adjusting a dial or a scale. To overcome these troublesome corrections, automatic corrections may be made through the use of signal means which are however, specific to each lens according to its aperture ratio. Such signal means on each of the interchangeable lenses may be of different form or secured in different positions in accordance with the aperture ratio of the particular lens and coupled to the exposure meter or its circuit to provide the automatic correction when a particular lens is mounted in the camera body.

The object of the present invention is to provide an automatic compensation system for full aperture photometry in a single lens reflex camera having a plurality of interchangeable lenses of different aperture ratios, wherein an interconnection is provided between the stop adjusting ring of the lens and a controlling member for the exposure meter or its circuit, the difference of the angle of rotation of the stop adjusting ring to its full opening position from a given position being a measure of the compensation to be made in the exposure meter or its circuit.

In carrying out the invention, the stop adjusting ring of the lens is provided with a fork which receives a pin on a rotatable interlocking ring provided on the camera body. The interlocking ring is connected to a control ring by a ratchet mechanism which is released upon rotation of the lens in mounting the lens to the camera or following the rotation of the interlocking ring. The interlocking ring is thus returned to the same angular position when changing from one lens to another. The control ring however remains in a particular angular position which is then repositioned by the coupling of another lens to the camera body to provide the necessary compensation for the exposure meter or its circuit.

This invention will be more fully understood and its advantages further appreciated by referring now to the following specification taken in conjunction with the accompanying drawings, in which:

FIGS. 5 through 10 are front view of the camera with the lens and parts removed to illustrate the cooperation of the various elements embodying the invention as a lens is mounted to the camera body, as the compensation is made, and when the lens is removed; while

Figure 1:
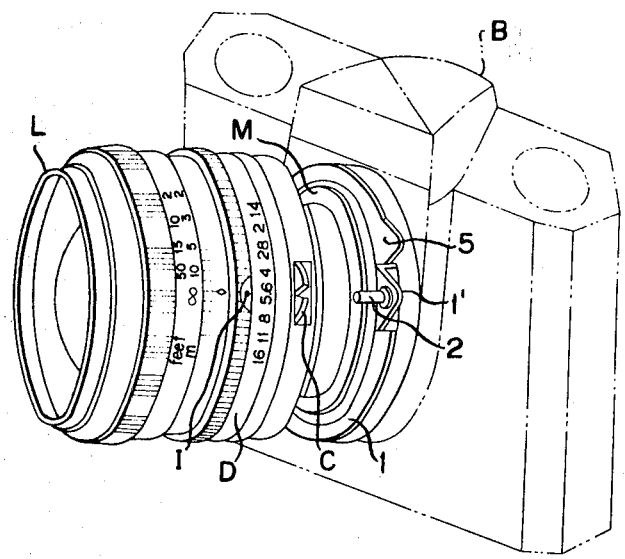
FIG. 1 is a perspective view of a lens mounted on a camera body embodying the invention.

Referring now to FIG. 1 of the drawings, a camera body B is shown in phantom lines provided with a lens mount M for receiving and mounting an interchangeable lens L. The lens L is provided with a stop adjusting ring D and an interlocking fork C rotatable with the stop adjusting ring. The lens mount M is of the usual bayonet type and provided with a cylindrical mounting, the details of which are not illustrated, on which an interlocking ring 1 and a control ring 4 are mounted for rotation.

Figure 2:
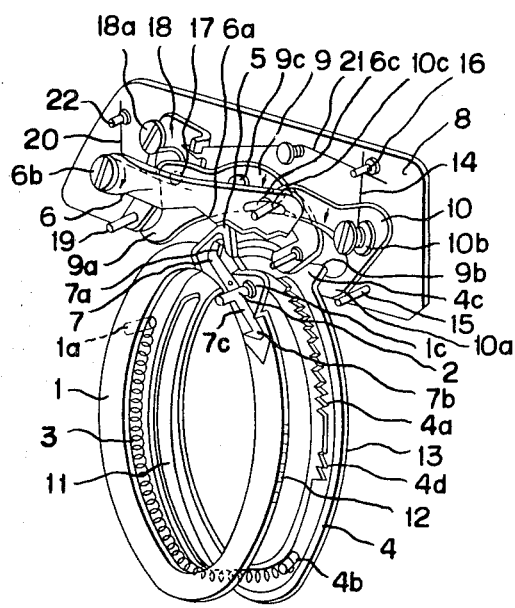
FIG. 2 is a perspective view illustrating the cooperation of the various interlocking elements embodying the invention.
Figure 3:
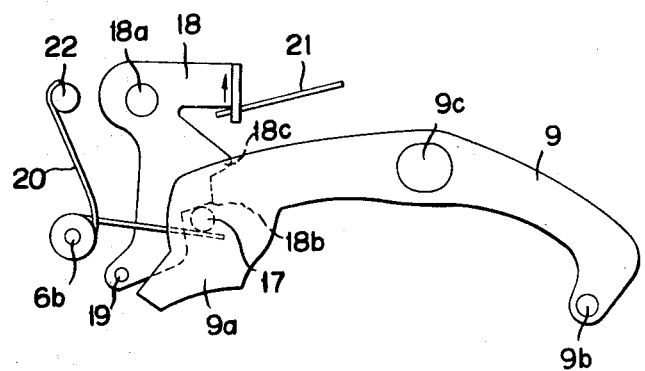
FIG. 3 is a plan view of a detent lever and a stepped lever illustrating the cooperation of the two levers.
Figure 4:
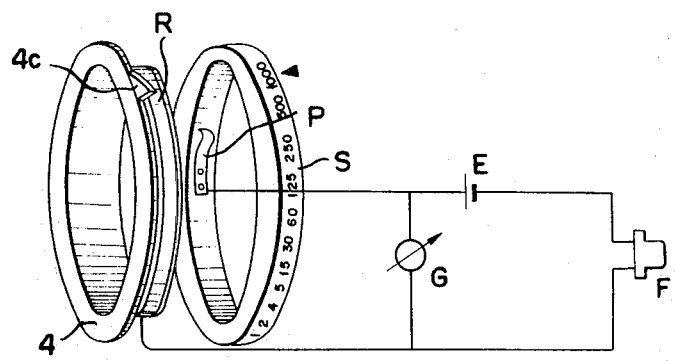
FIG. 4 is a perspective view of the control and shutter rings and a schematic circuit diagram of the exposure meter circuit illustrating one possible form of coaction between the control ring in compensating the exposure meter circuit.

The interlocking ring 1 is provided with a projecting portion 1' in which an interlocking pin 2 is secured and adapted to be engaged by the fork C of the stop adjusting ring D. Rotation of the stop adjusting ring will thus rotate the interlocking ring 1 through the pin and fork connection. With reference to FIGS. 2, 3, and 4, the control ring 4 is resiliently connected to the interlocking ring 1 by a spring 3 secured to a pin 1a in ring 1 and to a pin 4b in the control ring. The control ring 4 is formed with an annular groove 11 to accommodate the interconnecting spring 3, and with a projection 4c.

For purposes hereinafter appearing, the interlocking ring 1 is formed with a projection 5 which is suitably grooved to accommodate a pivoted ratchet lever 7 within the recess provided. As will hereinafter appear, the ratchet lever is provided on one end with a rearwardly extending detent portion 7a and at the other end with a ratchet pawl 7b. Forming a part of the control ring 4 are ratchet teeth 4a spaced at irregular intervals or at equal intervals in proportion to the number of exposure stages. The arrangement is such that the ratchet pawl 7b provided on the interlocking ring engages the ratchet teeth on the control ring 4.

Suitably secured within the camera body B is a base plate 8 on which a correcting cam lever 6, a detent lever 9, and an L-shaped lever 10 and a stepped lever 18 are pivoted. The correcting cam lever 6 is pivoted at one end on pivot 6b and provided with an irregular cam surface 6a at its lower edge adapted to be engaged by the projection 5 on the interlocking ring. In addition, the cam lever is formed with an elongated groove 6c. The detent lever 9 is pivoted intermediate its ends on pivot 9c and formed at one end with a cam portion 9a, and has secured thereto a rearwardly extending pin 17. It should be noted that the detent portion 7a of the ratchet lever extending rearwardly, passes beneath the cam surface 6a of the correcting lever so that there is no interference therewith. The detent portion 7a, however does lie in the path of the cam portion 9a of the detent lever and cooperates therewith in a manner to be described. The other end of the detent lever 9 is provided with a forwardly extending pin 9b which lies in the path of movement of the projection 5 on the interlocking ring 1. A spring 20 using the pin 6b as its pivot with its ends engaging the pin 17 and a pin 22 in the base plate biases the lever 9 clockwise about its pivot 9c (FIG. 3).

The L-shaped lever 10 is pivoted on pin 10b and is formed at one end with a detent or control portion 10a which lies in the path of movement of the projection 4c on the control ring. The lever 10 has secured in its other end a forwardly extending pin 10c which is received within the slot 6c of the correcting cam lever. A spring 14 having one end abutting a pin 16 secured in the base plate and the other end secured to the horizontal arm of the lever 10, biases the lever in a counter-clockwise direction as indicated by the arrow, so that the other arm of the lever abuts a stop or control pin 15 fixed in the base plate. It will be noted, that pin 10c received in the slot 6c of the correcting lever will cause rotation of the L-shaped lever about its pivot as the cam lever 6 is positioned about its pivot by the projection 5 on the interlocking ring 1. The cam surface 6a is such that its angular position about its pivot is determined by the F number of the inserted lens.

The stepped lever 18 is pivoted on pin 18a in the base plate 8 and is provided with a depending end formed with lower and upper steps 18b and 18c, respectively. At its lower end, the lever 18 has fixed therein a forwardly extending pin 19 which lies in the path of the projection 5 on the interlocking ring 1. A spring 21 anchored on one end by the pin 16 and abutting the horizontal arm of the stepped lever, biases the lever in a counterclockwise direction to bring about the abutment of the steps 18b or 18c with the rearwardly extending pin 17 on the detent lever 9 in a manner to be described.

Referring now to FIG. 4 of the drawings, the control ring 4 is herein illustrated as being of the flanged type, but need not be. A resistance strip R is secured to the control ring and the usual circuit connections are provided for the resistance R, a galvanometer G, a photocell F, battery supply E and a brush P. The brush P is secured in this instance to the internal surface of a shutter speed setting ring S of the camera and is adapted to engage the strip resistance F. It will be readily appreciated that elements of the galvanometer may be secured to the control ring 4, as for example the dial thereof which would thus be positioned by the positioning of the ring 4.

Figure 5:
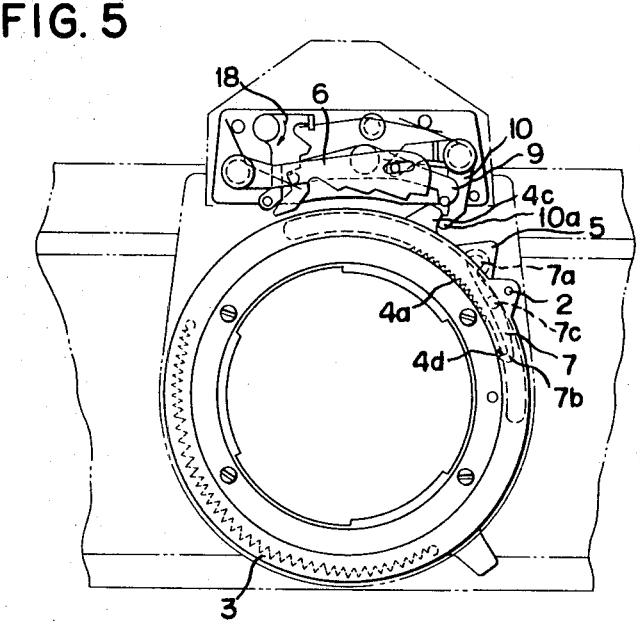
Figure 6:
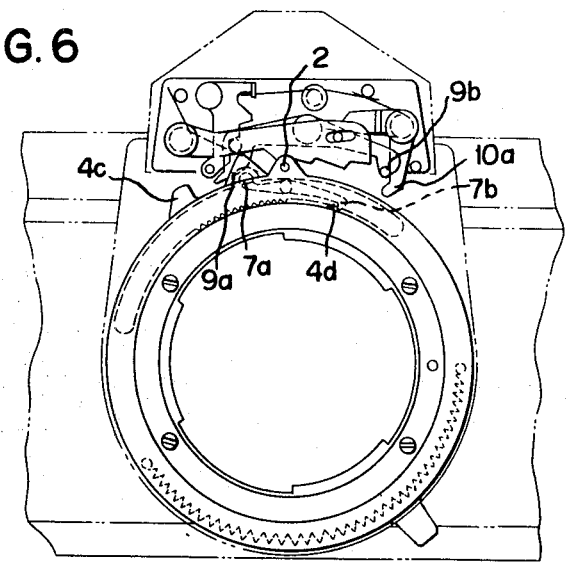

The cooperation of the various elements will now be described in mounting the lenses on a camera body. The interlocking ring 1 is rotated clockwise by clockwise rotation of the stop ring D. Through the connection of spring 3, the control ring 4 is also rotated clockwise until the projection 4c abuts the detent or control portion 10a of the lever 10. With the clockwise rotation of the interlocking ring 1, the ratchet pawl 7b of pawl lever 7 is moved over the teeth 4a and engages one of the teeth in the controlling position 4d of the ratchet (FIG. 5). With the rings 1 and 4 now interconnected by the ratchet lever 1 and ratchet teeth 4d, the subsequent counterclockwise rotation of the lens mount M will rotate the rings simultaneously until the pin 2 and fork C are stopped in their topmost position (FIG. 6).

Figure 7:
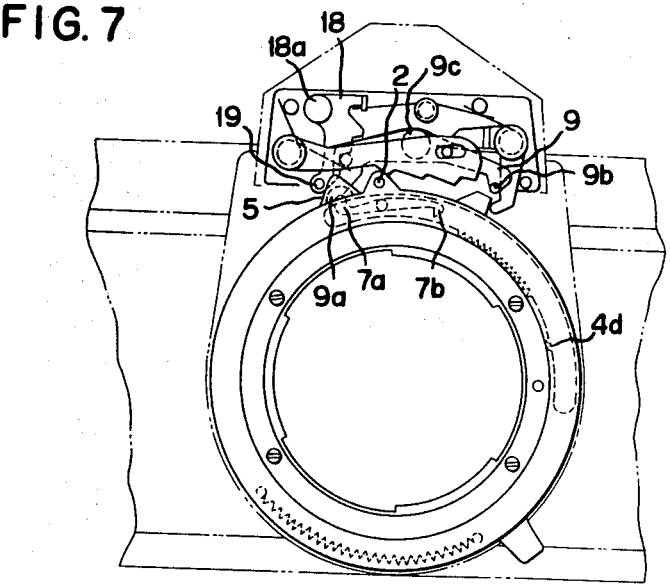
Figure 8:
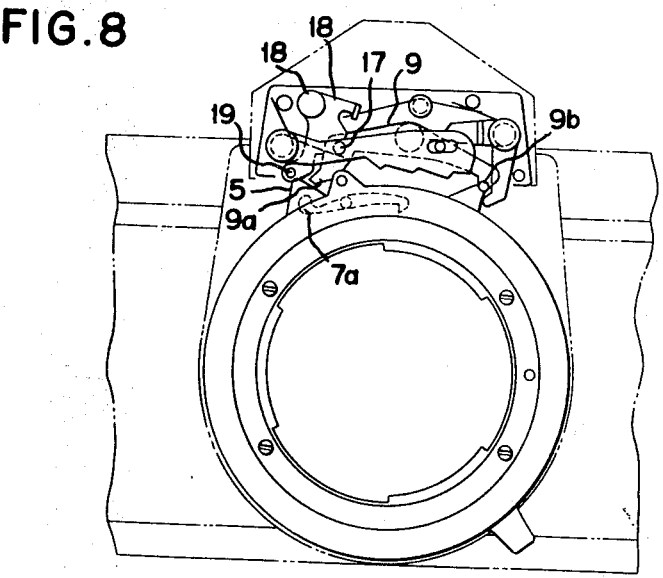

The stop ring D of the camera lens is now rotated counterclockwise to a desired stop opening, thereby rotating the interlocking ring 1 in the same direction through pin 2. When the ring 1 is rotated in a counterclockwise direction, the detent portion 7a of the ratchet lever is moved into abutment with the cam portion 9a of the pivoted lever 9 (FIG. 7). This abutment pivots the ratchet lever counterclockwise to disengage the pawl 7b from ratchet teeth 4d to permit clockwise rotation of the control ring 4 by the interconnecting spring 3, until the point is reached where the projection 4c of the ring engages detent portion 10a of the lever 10. Should the ring 1 be rotated counterclockwise, the projection 5 on the interlocking ring abuts the pin 19 on stepped lever 18 (FIG. 8), to rotate the lever clockwise against the bias of spring 21. The clockwise rotation of lever 18 permits the spring 20 to rotate the lever 9 clockwise so that the pin 17 thereon engages the upper step 18c of the stepped lever. With the lever 9 in this upper step position, the cam portion 9a thereof moves out of the path of detent portion 7a of the ratchet lever 7 (FIG. 8).

Figure 9:
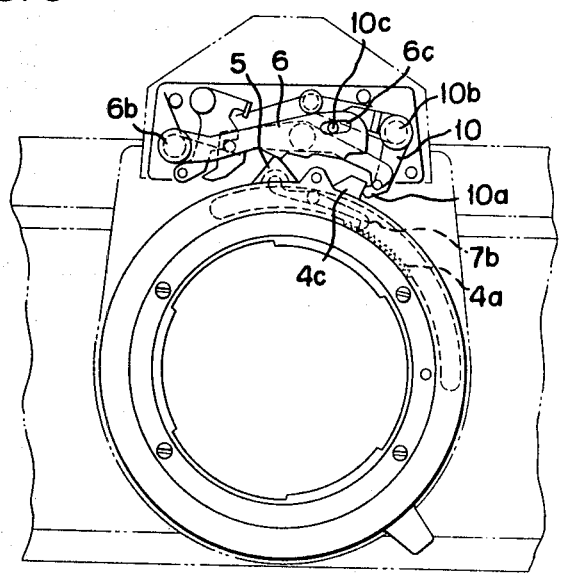

With the preliminary explanation of the cooperation of the various elements described, let it now be assumed that an F 5.6 lens is mounted in the lens mount M and the lens is rotated clockwise to its full aperture opening. The interlocking ring 1 will be rotated in the same direction moving the projection 5 along the cam portion 6a of the correcting cam lever 6, and moving the ratchet pawl 7b over the ratchet teeth 4a on the control ring 4 until it drops into control portion 4d. When the interlocking ring 1 is in the full stop position, the correcting cam lever 6 is positioned relative its pivot 6b by the projection 5 on ring 1. This positioning of the cam lever 6 carries the pin 10c projecting through the groove 6c of the lever to position the lever 10 and its detent portion 10a. Thus, projection 4c on the control ring 4 may be rotated (by spring 3) in a counterclockwise direction to change the relative positions of the rings 1 and 4 (FIG. 9).

With reference to FIG. 4 the resistance strip R on the control ring 4 is engaged by the brush P secured to the shutter ring S. With the positioning of the control ring 4 relative to the stop ring D, the control ring is also positioned relative to the brush P to provide an initial resistance value which is different for the full stop openings of the various interchangeable lenses provided for the camera.

Figure 10:
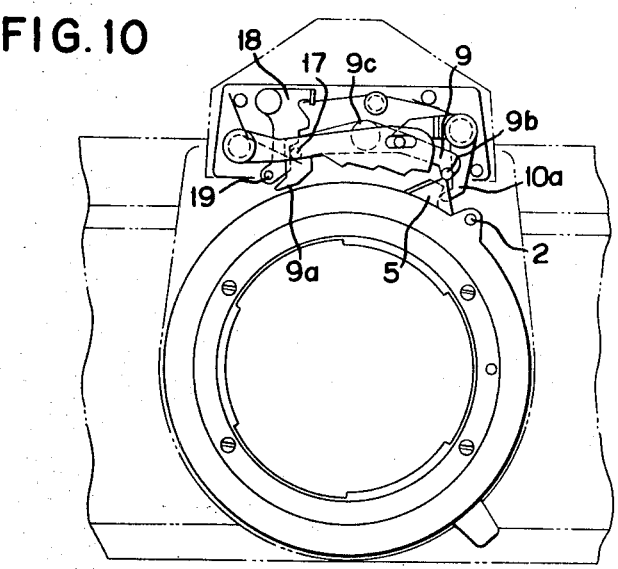

In removing the lens from the camera to exchange lenses, the lens is rotated clockwise thereby rotating the interlocking ring 1 in the same direction. The control ring 4 however is not rotated since the projection 4c thereon abuts the detent portion 10a of the lever 10. The clockwise rotation of the ring 1 moves the ratchet pawl 7b over the ratchet teeth 4a and at the same time moves the projection 5 thereon against the pin 9b on the lever 9 (FIG. 10). The lever 9 is thus rotated counterclockwise about its pivot 9c to lower the pin 17 on the other end of the lever. This permits the stepped lever 18 to be rotated counterclockwise by its spring 21 so that the pin 17 engages the lower step 18b of the lever. This positions the cam surface 9a of the lever 9 and pin 19 on the stepped lever in the path of the projection 5 on the interlocking ring, and thus leaves the interlocking ring and control ring positioned by the ratchet pawl 7b and the projection 4c on the interlocking and control rings, respectively. Another lens may then be inserted in the lens mount M and rotated to its full stop position whereupon the interlocking and control rings are relatively repositioned to compensate for the F number of the inserted lens.

Figure 11:
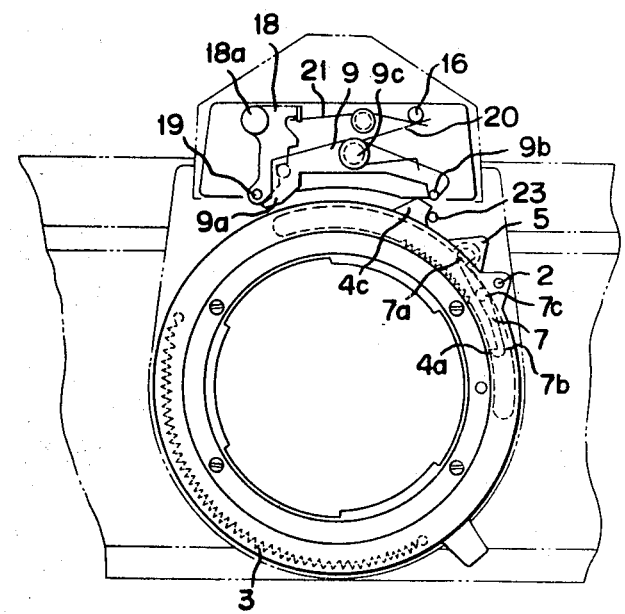
FIG. 11 is a plan view similar to FIGS. 5 through 10 illustrating another embodiment of the invention.

Referring now to FIG. 11 wherein a modified embodiment of the invention is illustrated, like parts are designated by the same reference characters. It will be noted that the correcting cam lever 6 and the L-shaped lever 10 have been omitted. A control pin 23 is mounted on the base plate 8 in the path of the projection 4c of the control ring 4.

In the embodiment illustrated in FIGS. 2 through 10, it is assumed that the full aperture F number is proportionately changed and that a disproportionate change of light intensity falls on the exposure meter surface. If the light intensity and the full aperture F number are proportionately changed, then the correcting cam lever 6 is not always required. The detent or control portion 10a of the L-shaped lever however may be replaced by a fixed detent or control pin 23 in this embodiment. When the change in the light amount falling on the photocell surface is not proportionate to the change in the F number, a change in the angle of rotation required in correcting for the unproportional light amount may be provided by changes in the interconnecting ratchet mechanism, as for example, making the ratchet teeth spacings unequal. Thus the embodiment as illustrated in FIG. 11 provides a simplified structure, operating in the manner described, with an equal degree of accuracy under the conditions noted.

We claim:

1. Device for compensating an exposure meter circuit according to the full stop openings of interchangeable lenses provided for a single lens reflex camera, comprising:

an interlocking member rotatably mounted on the camera body and adapted to be rotated by the stop ring of the lens inserted in the lens mount of the camera;

a first control member mounted on the camera body and rotated coaxially with said interlocking member;

a resilient connection between the interlocking and control members;

a ratchet mechanism interconnecting the interlocking and control members;

means for angularly displacing the relative positions of the interlocking and control member upon rotation of the lens stop ring to its wide open position, the ratchet mechanism locking the two members in their relative angular positions to permit the two members to be rotated in unison upon rotation of the lens stop ring;

an exposure meter; and means for compensating the exposure meter in accordance with the degree of angular rotation of the first control member to the full stop position of the lens mounted in the camera mount.

2. Compensating device according to claim 1 wherein said interlocking and first control members are rings respectively and the ratchet mechanism includes a ratchet lever pivoted intermediate its ends to the interlocking ring, a detent portion on one end of the ratchet lever, a pawl on the other end of the ratchet lever, and ratchet teeth secured to the control ring and engaged by the pawl:

a projection on the interlocking ring;
  a pin on the interlocking ring;
  a detent lever pivoted intermediate its ends to the camera body, a cam on one end of the detent lever in the path of the ratchet lever detent position, a pin in the other end of the detent lever in the path of the interlocking ring projection, and a second pin in the one end of the detent lever;
  a stepped lever pivoted to the camera body having upper and lower steps, biasing means for biasing the steps against the second pin of the detent lever, and a pin in the stepped lever in the path of the interlocking ring projection;
  a projection on the control ring; and
  a second control member in the path of the control ring projection, rotation of the lens stop ring in one direction causing the abutment of the control ring projection against the control member to position the control ring to its full stop position permitting the ratchet mechanism to engage and provide a relative displacement of the two rings according to the F number of the lens inserted, rotation of the stop ring in an opposite direction bringing the interlocking ring projection into engagement with the stepped lever and permit the detent lever pin to engage the upper step to change the angular position of engagement of the ratchet mechanism and the relative positions of the interlocking and control rings.

3. Compensating device according to claim 2, wherein the control member includes a pivoted control lever having a detent portion and a pin secured therein, a stop pin, and resilient means biasing the control lever against the stop:

a pivoted cam lever having a camming surface in the path of the interlocking ring projection and formed with a slot for receiving the control lever pin; and
  the rotation of the lens stop ring in the one direction abutting the interlocking ring projection against the cam lever surface to position the cam lever and the control lever through the pin and slot connection to a position in accordance with the F number of the lens wherein it is abutted by the control ring projection.